(12) United States Patent
Kennedy et al.

(10) Patent No.: US 8,430,244 B2
(45) Date of Patent: Apr. 30, 2013

(54) SYSTEMS AND METHODS FOR ELECTRICAL STORAGE DEVICE ISOLATION

(76) Inventors: Doug Kennedy, Moab, UT (US); Greg Kennedy, Moab, UT (US)

( * ) Notice: Subject to any disclaimer, the term of this patent is extended or adjusted under 35 U.S.C. 154(b) by 504 days.

(21) Appl. No.: 11/948,787

(22) Filed: Nov. 30, 2007

(65) Prior Publication Data

US 2008/0131770 A1 Jun. 5, 2008

Related U.S. Application Data

(60) Provisional application No. 60/868,383, filed on Dec. 4, 2006.

(51) Int. Cl.
*B65D 73/00* (2006.01)
*B65D 85/00* (2006.01)

(52) U.S. Cl.
USPC .................. 206/704; 206/460; 206/703

(58) Field of Classification Search ........... 429/176; 206/460, 703–705
See application file for complete search history.

(56) References Cited

U.S. PATENT DOCUMENTS

| | | | |
|---|---|---|---|
| 4,015,708 A | 4/1977 | Kelm | |
| 4,700,531 A | 10/1987 | Hsu et al. | |
| 5,033,616 A | 7/1991 | Wyser | |
| 5,153,038 A | 10/1992 | Koyama et al. | |
| 5,516,581 A * | 5/1996 | Kreckel et al. | 428/317.3 |
| 5,591,540 A | 1/1997 | Louie et al. | |
| 6,080,508 A | 6/2000 | Dasgupta et al. | |
| 6,244,444 B1 * | 6/2001 | Jacobus et al. | 206/703 |
| 6,280,085 B1 | 8/2001 | Beer | |
| 6,689,511 B2 | 2/2004 | Yamada et al. | |
| 6,790,556 B1 | 9/2004 | Meitav et al. | |
| 2003/0183552 A1 | 10/2003 | Schein et al. | |
| 2004/0142236 A1 * | 7/2004 | Kim et al. | 429/144 |
| 2005/0022472 A1 | 2/2005 | Brakes et al. | |
| 2005/0220942 A1 | 10/2005 | Wu et al. | |

FOREIGN PATENT DOCUMENTS

JP 08298139 A * 11/1996

OTHER PUBLICATIONS

Kimura et al., Machine translation of JP 08-298139 A, Nov. 1996.*

* cited by examiner

*Primary Examiner* — Basia Ridley
*Assistant Examiner* — Sean P Cullen
(74) *Attorney, Agent, or Firm* — Baker & Associates PLLC; Trent H. Baker

(57) ABSTRACT

The present invention relates to adhesive-based battery isolation systems and methods of use. Embodiments of the present invention include utilizing one or more adhesive members to electrically isolate a used battery or electrical storage device such that it may be positioned back within an open package for storage without exposure to moisture. One embodiment of the present invention relates to an electrical storage and isolation system including an electrical storage device, a storage compartment, and at least one adhesive member. The storage compartment may be any form of storage compartment with a releasable opening such as conventional retail plastic package or a flexible retort type package. The system may include one or more adhesive members for use in electrically isolating an electrical storage device.

7 Claims, 4 Drawing Sheets

SYSTEMS AND METHODS FOR ELECTRICAL STORAGE DEVICE ISOLATION

RELATED APPLICATIONS

This application claims priority to U.S. provisional application Ser. No. 60/868,383 filed Dec. 4, 2006, the contents of which are incorporated by reference.

FIELD OF THE INVENTION

The invention generally relates to electrical storage systems such as batteries. In particular, the present invention relates to an adhesive-based battery isolation system and method of use.

BACKGROUND OF THE INVENTION

Portable electrical devices require a power source or power supply to provide the necessary electricity to operate. For example, flashlights commonly utilize one or more batteries to provide electricity to illuminate an LED or bulb. A battery is a common type of portable electric power source. Batteries are designed to provide a particular amperage and voltage for a particular duration or capacity. The size of a battery is directly proportional to the voltage, amperage, and capacity. Batteries are made with various form factors, output voltages, output amperages, and capacities. One of the problems with long-term portable electric device usage is the necessity to carry additional batteries. Since a user cannot easily estimate the remaining life of a battery or the battery usage required for a particular activity, it is generally necessary to carry extra batteries. Carrying additional batteries is problematic for many reasons, including inadvertent loss, inconvenience, battery damage, or improperly sized additional batteries.

Another problem associated with carrying extra batteries involves effectively storing and properly disposing of the discharged or used batteries so as to prevent damage to other devices and/or personal exposure to harmful chemicals. Batteries can leak or emit hazardous materials if they are exposed to water, other conductive materials, corrosive chemicals, extreme temperatures, etc. Batteries generally include a positive and negative terminal or region and are easily "shorted" if a continuous conductive material contacts both terminals/regions simultaneously. Likewise, many battery form factors are extremely small and can easily be misplaced or lost, thereby allowing for the possibility of hazardous chemical leakage. For example, commonly used coin cell or button cell batteries are shaped in the form a small circular disc, which can easily be misplaced.

Therefore, there is a need in the industry for an effective electrical storage system that overcomes the problems discussed above.

SUMMARY OF THE INVENTION

The present invention relates to adhesive-based battery isolation systems and methods of use. Embodiments of the present invention include utilizing one or more adhesive members to electrically isolate a used battery or electrical storage device such that it may be positioned back within an open package for storage without exposure to moisture. One embodiment of the present invention relates to an electrical storage and isolation system including an electrical storage device, a storage compartment, and at least one adhesive member. The storage compartment may be any form of storage compartment with a releasable opening such as conventional retail plastic package or a flexible retort type package. The system may include one or more adhesive members for use in electrically isolating an electrical storage device. A second embodiment of the present invention relates to a method for electrically isolating an electrical storage device, including the acts of adhering the electrical storage device to an adhesive member and folding the adhesive member over upon itself so as to enclose the electrical storage device within a non-conductive sealed inner region. A third embodiment of the present invention relates to a method for electrically isolating an electrical storage device utilizing two adhesive members. In addition, embodiments of the present invention may also be applied to distinguish used batteries from unused batteries in multi-battery applications.

Embodiments of the present invention represent a significant advance in electrical device isolation and storage. The ability to electrically isolate a discharged battery in a mobile environment enables proper disposal and minimizes risks of toxic chemical leakage and/or exposure. A user may therefore efficiently contain a used/expended electrical storage device without risking exposure to toxic chemicals or long term environmental damage. In addition, the ability to combine the electrical isolation systems with conventional electrical storage systems further enables these techniques to be utilized in mobile environments by conveniently packaging both the storage compartment and the electrical isolation system in a single unit.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

Figure 1A:
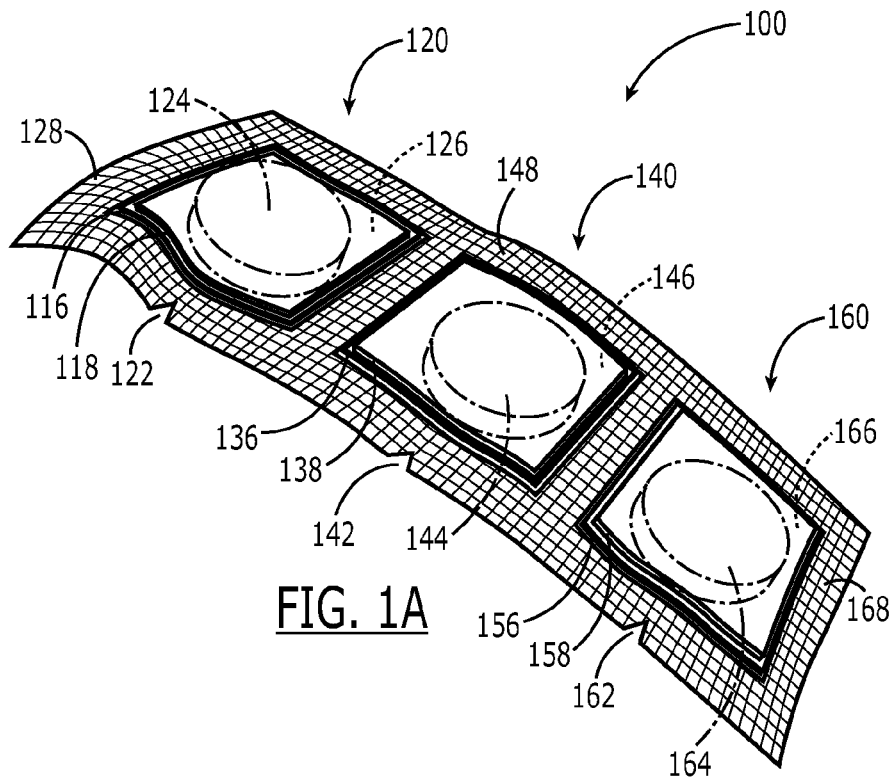
FIG. 1A illustrates a perspective view of a retort type electrical storage system including an electrical isolation system in accordance with one embodiment of the present invention.

The present invention relates to adhesive-based battery isolation systems and methods of use. Embodiments of the present invention include utilizing one or more adhesive members to electrically isolate a used battery or electrical storage device such that it may be positioned back within an open package for storage without exposure to moisture. One embodiment of the present invention relates to an electrical storage and isolation system including an electrical storage device, a storage compartment, and at least one adhesive member. The storage compartment may be any form of storage compartment with a releasable opening such as conventional retail plastic package or a flexible retort type package. The system may include one or more adhesive members for use in electrically isolating an electrical storage device. A second embodiment of the present invention relates to a method for electrically isolating an electrical storage device, including the acts of adhering the electrical storage device to an adhesive member and folding the adhesive member over upon itself so as to enclose the electrical storage device within a non-conductive sealed inner region. A third embodiment of the present invention relates to a method for electrically isolating an electrical storage device utilizing two adhesive members. In addition, embodiments of the present invention may also be applied to distinguish used batteries from unused batteries in multi-battery applications. Also, while embodiments of the present invention are described in reference to an electrical isolation and storage systems, it will be appreciated that the teachings of the present invention are applicable to other areas.

The following terms are defined as follows:

Electrical storage device—any electrical storage system such as a battery which is configured to generate a particular voltage and current for a specific time. An electrical storage device may include any electrical capacity, physical shape, or packaging format, including but not limited to coin cell, AA, AAA, etc. The term "battery" will be used interchangeably with "electrical storage device" throughout the application; no additional meaning is intended from the use of either particular term.

Electrical storage compartment—any system for housing and storing an electrical storage device such as a retail plastic type or sealed retort type pouch. A retail plastic type storage system is conventionally used to sell batteries and generally includes a transparent plastic member releasably coupled to a supportive cardboard back member. The electrical storage device/battery is stored within an internal region. Likewise, a sealed retort type pouch is an alternative electrical storage compartment.

Electrical isolation—a state of substantially isolating an electrical storage device by surrounding and/or sealing it within a non-conductive material. For example, wrapping and enclosing a battery within a piece of non-conductive material would electrically isolate the battery from other items. Various degrees of electrical isolation may include an airtight or watertight seal enclosing the battery within the non-conductive material.

Reference is initially made to FIG. 1, which illustrates a perspective view of a retort type battery storage system including an isolation system in accordance with one embodiment of the present invention, designated generally at 100. Initially, the illustrated electrical storage aspects of the system will be described; the electrical isolation aspects of the system will then subsequently be described. The system 100 includes three sealed pouches 120, 140, 160 coupled to one another in a strip configuration. The pouches 120, 140, 160 are coupled along a common axis so as to form a continuous strip. Any number of pouches may be coupled together and remain consistent with the present invention. The system further includes three batteries 124, 144, 164. The batteries are positioned within the sealed pouches 120, 140, 160 as illustrated. The illustrated batteries 124, 144, 164 are coin cell batteries configured in which the positive terminal is disposed on one flat side and the negative terminal is disposed on the opposite flat side. Various battery sizes, shapes, packaging, capacities, etc. may be utilized in conjunction with the system 100.

The pouches 120, 140, 160 further include a seal 128, 148, 168, an internal region 126, 146, 166, and an opening system 122, 142, 162. The internal region 126, 146, 166 is a three dimensional region in which the batteries 124, 144, 164 are correspondingly disposed. The internal region 126, 146, 166 is three dimensionally sealed by the seal 128, 148, 168. The internal region 126, 146, 166 is surrounded by a non-conductive material so as to prevent inadvertent short circuiting of the enclosed batteries 124, 144, 164. The seal 128, 148, 168 includes a multi-layer flexible material positioned above and below the batteries 124, 144, 164. The seal 128, 148, 168 further includes bonded regions in which the multi-layer flexible material is bonded to itself, thereby individually sealing the internal regions 126, 146, 166. The bonded regions may also be referred to as laminated regions in that lamination may be used to bond the layers of the multi-layer flexible material in the pattern illustrated. The illustrated combination of a single internal region 126 and seal 128 is commonly referred to as a retort pouch.

The opening systems 122, 142, 162 refer to a system that allows a user to open or expose the internal region 126, 146, 166 and the batteries 124, 144, 164. An individual opening system is necessary to enable a user to individually remove the batteries 124, 144, 164 from the remainder of the system 100. The illustrated opening system 122, 142, 162 is a slit or notch that allows a user to permanently hand-tear open or expose the internal region 126, 146, 166. The illustrated slits create a tactile weakness in the multi-layer flexible material of the seal 128, 148, 168, which allows for a user to tear open the internal region 126, 146, 166 by applying opposite forces. Various alternative opening systems may also be utilized in conjunction with the system 100, including but not limited to the releasable opening system illustrated in FIGS. 3A-3D.

Reference to FIG. 1A is continued, with aspects of the electrical isolation system 100 be described below. A first adhesive member 116, 136, 156 and a second adhesive member 118, 138, 158 are releasably coupled to each of the sealed pouches 120, 140, 160, respectively. The first and second adhesive members 116, 136, 156, 118, 138, 158 are releasably coupled/adhered to the outside of each sealed pouch 120, 140, 160 to facilitate convenient deployment. The first and second adhesive members 116, 136, 156, 118, 138, 158 are positionally independent of the opening systems 122, 142, 162 or each sealed pouch 120, 140, 160. In addition, the first and second adhesive members 116, 136, 156, 118, 138, 158 disposed on each sealed pouch 120, 140, 160 are substantially overlappingly positioned. Various geometrical and positional orientations may be utilized to facilitate intuitive identification of the adhesive members with respect to the pouches. Further, as described in embodiments below, a single adhesive member may be positioned on each of the sealed pouches 120, 140, 160. The illustrated adhesive members 116, 136, 156, 118, 138, 158 further include an adhesive side oriented toward the sealed pouches 120, 140, 160, and a non-adhesive side oriented away from the sealed pouches 120, 140, 160. The adhesive side is composed of non-conductive materials. The adhesive side may utilize a chemical adhesive agent including but not limited to epoxy, glue, etc. The composition of the chemical adhesive agent and the materials utilized for the exterior of sealed pouches 120, 140, 140 and non-adhesive surface are selected so as to facilitate the desired repeatable adhesive releasing therebetween. For example, the adhesive agent on the adhesive side of each of the adhesive members 116, 136, 156, 118, 138, 158 may be used to releasably couple the adhesive members 116, 136, 156, 118, 138, 158 to the sealed pouches 120, 140, 160 but must retain sufficient adhesive properties to effectuate one of the electrical isolation methods described below. It will be appreciated that the adhesive members 116, 136, 156, 118, 138, 158 may be transparent or opaque depending on the application. One example of an adhesive member composition which may be utilized in conjunction with embodiments of the present invention is commonly referred to as "tape", including but not limited to packing, masking, duct, etc.

In operation, a user may remove the battery 124 from the first pouch 120 by performing particular acts. If the system 100 is rolled up or compressed in any way, the user must initially flatten out and/or expose the first pouch 120. The user must then grasp opposite sides of the slit. For example, a user may utilize an index finger and thumb of each hand to grasp the opposite sides. The user then exerts outward opposing forces on the slit. For example, the user may direct the left portion up and the right portion down, thereby exerting a ripping force on the seal 128 of the pouch 120. Various sealing, stitching, and opening system 122 orientations may be included to direct the ripping force away from the adhesive members to facilitate access to the battery 124 without damaging the corresponding adhesive members 116, 118. The ripping force can be continued so as to sufficiently expose the battery 124 for removal. The user may not wish to continue the ripping force beyond the internal region 126, so as to maintain a coupling between the two portions of the pouch 120. After the battery/electrical storage device 124 has been expended, a user may then remove the corresponding adhesive members 116, 118 and electrically isolate the battery 124 for disposal or storage. Various methods of electrical isolation utilizing at least one adhesive member in accordance with embodiments of the present invention are described below. The electrically isolated battery 124 may be repositioned back within the opened pouch 120 for effective storage until proper disposal (not shown). It will be appreciated that the opened first pouch 120 with an electrically isolated battery 124 would create a visually identifiable differentiator from the remaining pouches and batteries.

In an alternative embodiment, an electrical storage device isolation system may be configured similarly to FIG. 1A. However, a single adhesive member may be used over each of the pouches 120, 140, 160 rather than the two adhesive members 116, 136, 156, 118, 138, 158 illustrated and described in reference to FIG. 1A. The single adhesive member may be similarly composed, oriented, and releasably coupled/adhered to the exterior of the storage pouch 120, 140, 160 to facilitate convenient deployment. However, in operation, the single adhesive member may be utilized to effectuate the electrical isolation utilizing the methods described below. It will be appreciated that in place of a second adhesive member, the single adhesive member may utilize the exterior of the pouch 120, 140, 160. Therefore, a battery could be isolated through a method of sealing between the single adhesive member and the pouch.

Figure 1B:
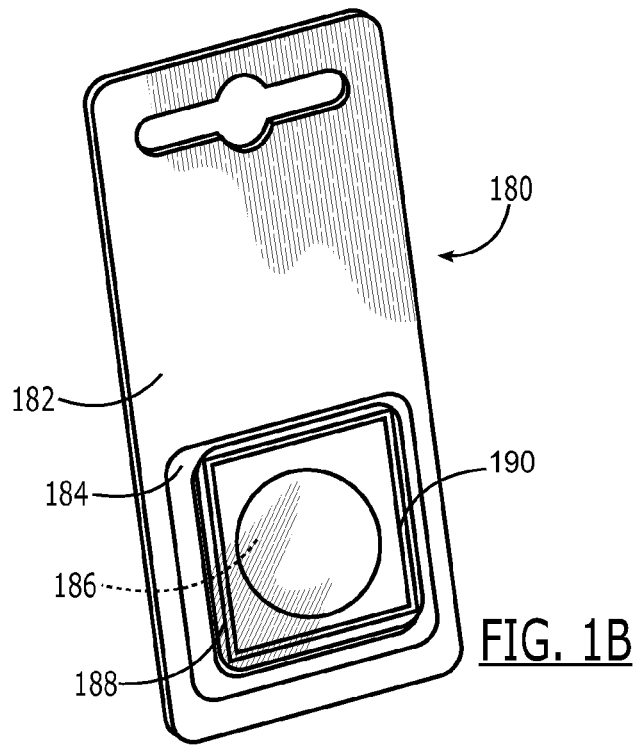
FIG. 1B illustrates a perspective view of a retail plastic type electrical storage system including an electrical isolation system in accordance with an alternative embodiment of the present invention.

Reference is next made to FIG. 1B, which illustrates a perspective view of a retail plastic type electrical storage system including an electrical isolation system in accordance with an alternative embodiment of the present invention, designated generally at 180. The illustrated system 180 includes an electrical storage device/battery 186 releasably sealed between a plastic transparent member 184 and a supportive cardboard backing 182. Similar to the system 100 illustrated in FIG. 1A, a first and second adhesive member 188, 190 are disposed on an exterior surface of the plastic transparent member 184 for use in electrically isolating the expended battery 186. In operation, a user may remove the battery 186 from the system 180 by tearing the coupling between the plastic transparent member 184 and the supportive cardboard backing 182. And as described above and below, upon expenditure, the battery 186 may be electrically isolated by sealing between the two adhesive members (or a single adhesive member and the plastic transparent member). Likewise, the electrically isolated battery may optionally be repositioned between the plastic transparent members 184 and the supportive cardboard backing 182 to facilitate storage until proper disposal is available.

Figure 2:
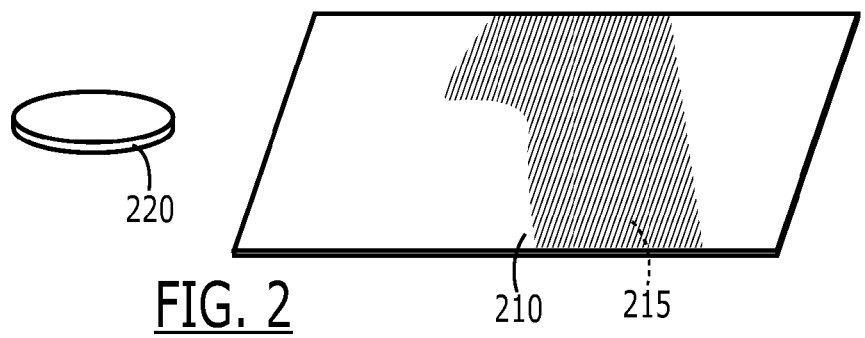
FIGS. 2-4 illustrate a method of electrically isolating an electrical storage device in accordance with a second embodiment of the present invention.
Figure 3:
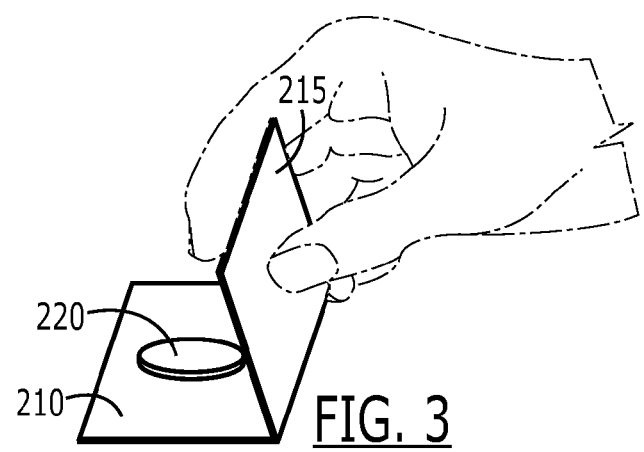
Figure 4:
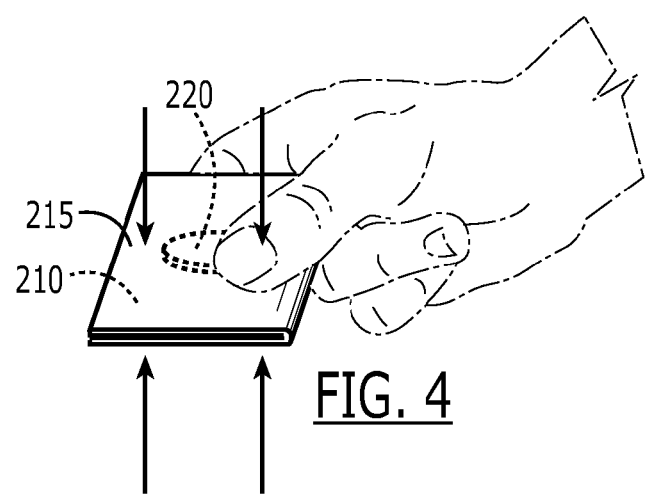

Reference is next made to FIGS. 2-4, which illustrate a method of electrically isolating a battery in accordance with a second embodiment of the present invention. The method of electrical isolation includes providing an electrical storage device, such as the illustrated coin cell battery 220, and an adhesive member, such as a substantially two dimensional member with an adhesive side 210 and a non-adhesive side 215. As described above, the adhesive side 210 may include some form of adhesive agent to generate a repeatable adhesion. It will be appreciated that the adhesive side 210 may include one or more adhesive regions that do not necessarily extend across the entire two dimensional surface of the adhesive side. For example, an adhesive region may include a non-adhesive gap corresponding to the battery 220 and/or the location at which the folding occurs (not shown). A surface of the battery 220 is coupled to a first portion of the adhesive side 210 within the two dimensional area of the adhesive side 210, as illustrated. The surface of the battery 220 may be an electrical terminal (as illustrated the coin cell) or a non-electrical surface of the battery. The coupling may be either adhesive or a basic physical positioning. A second portion of the adhesive side 210 is folded or wrapped over the battery 220 as illustrated in FIGS. 3 and 4. The second portion preferably measures approximately half of the adhesive side 210 so as to create a balanced enclosure region between the first and remaining portion of the adhesive side 210. The adhesive agent may extend on either or both the first and second portions of the adhesive side 210. The opposing portions of the non-adhesive side 215 of the adhesive device are then compressed so as to couple the adhesive sides 210 together, thereby encasing, enclosing, and/or sealing the battery 220 within the adhesive member and electrically isolating the battery 220. The compression is generated by applying oppositely oriented forces upon the opposing portions of the non-adhesive side 215. Various degrees of sealing may be generated depending on the particular adhesive properties, including but not limited to physical sealing, water-tight sealing, and/or air-tight sealing. The adhesive agent and characteristics of the adhesive side may be adjusted depending on the toxicity and usage model of the particular electrical device to be isolated.

Figure 5:
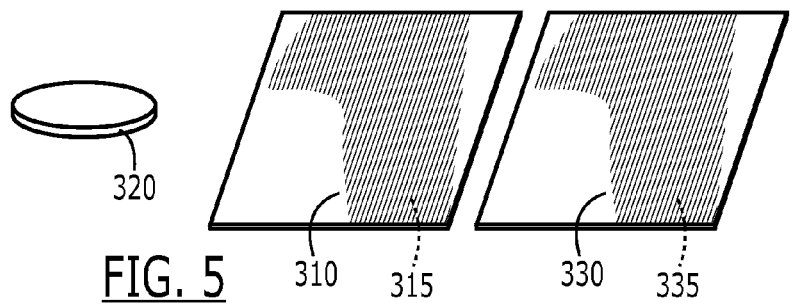
FIGS. 5-7 illustrate a method of electrically isolating an electrical storage device in accordance with a third embodiment of the present invention.
Figure 6:
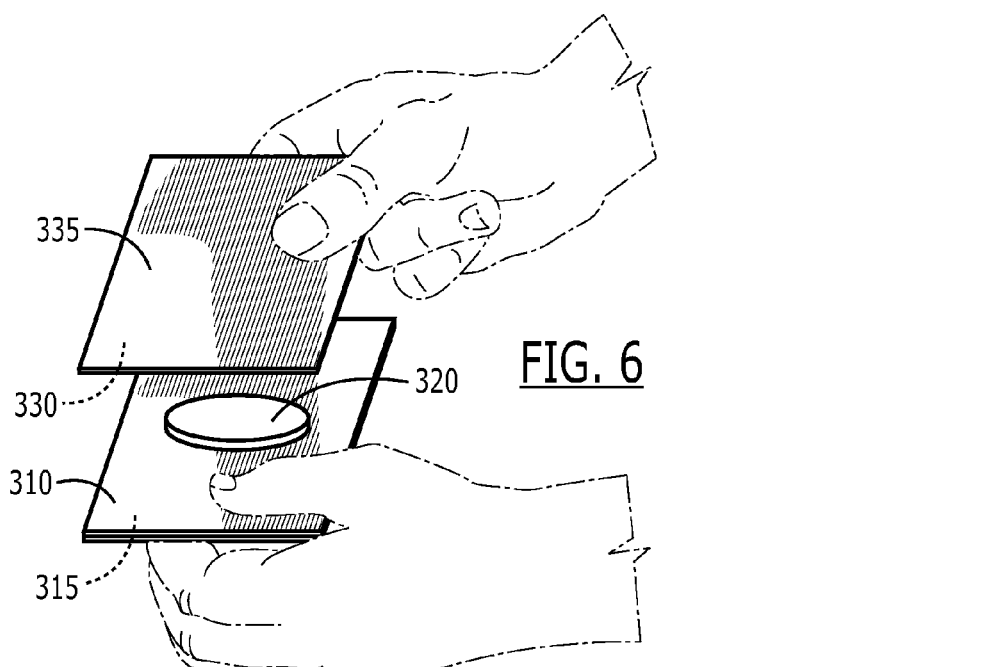
Figure 7:
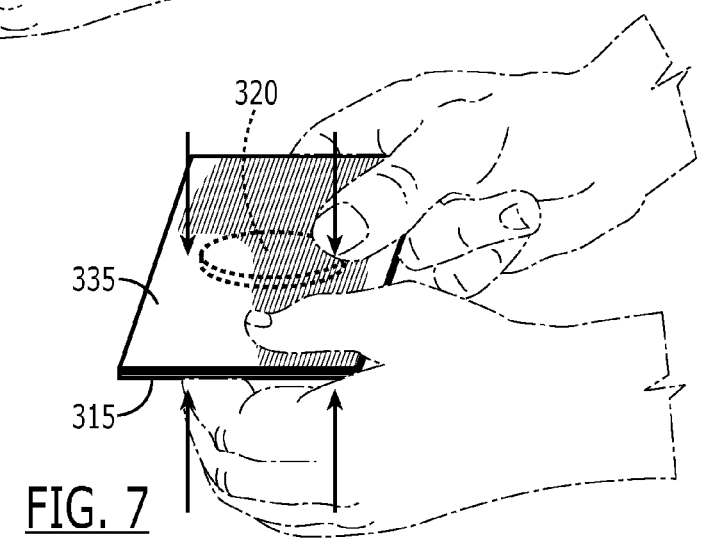
Figure 8:
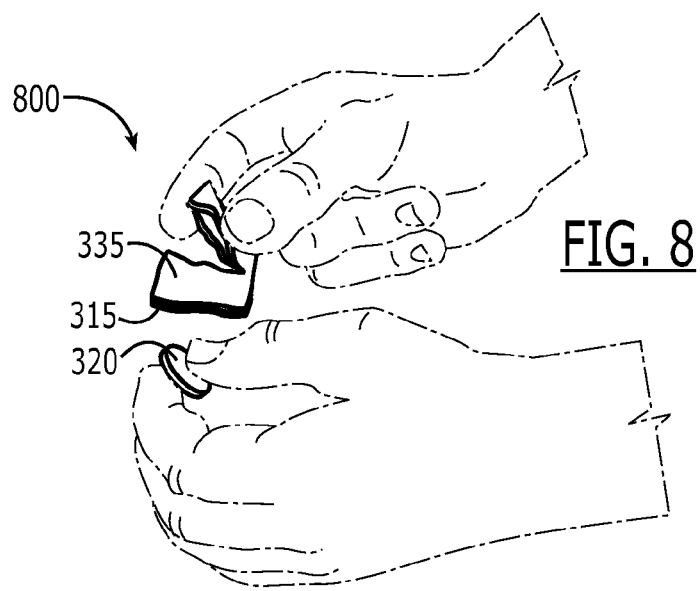
FIGS. 8-10 illustrate a method of replacing an electrically isolated electrical storage device back in an opened storage package in accordance with further embodiments of the present invention.
Figure 9:
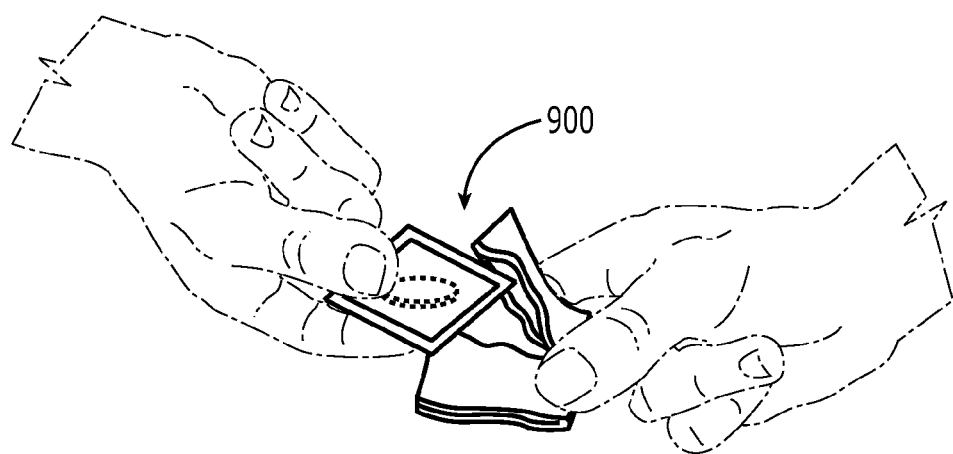
Figure 10:
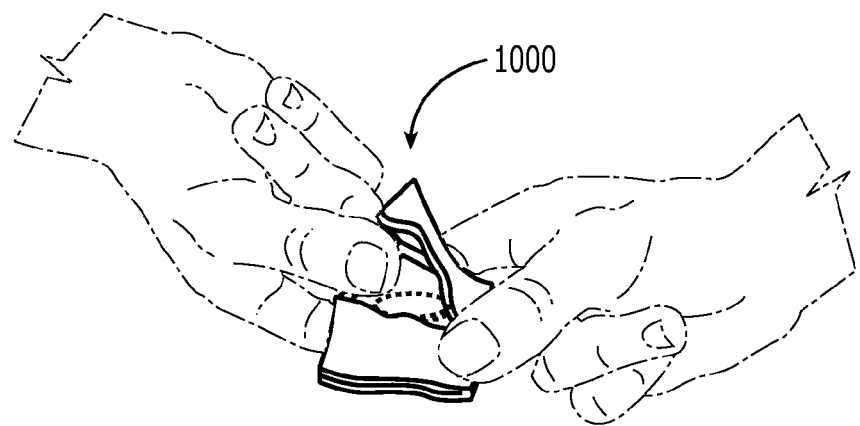

Reference is next made to FIGS. 5-7, which illustrate a method of electrically isolating a battery in accordance with a third embodiment of the present invention. The method of electrical isolation includes providing an electrical storage device, such as the illustrated coin cell battery 320, and two adhesive members, such as the first and second members with adhesive sides 310, 330 and non-adhesive sides 315, 335. As described above, the adhesive sides 310, 330 may include some form of adhesive agent to generate a repeatable adhesion. It will be appreciated that the adhesive sides 310, 330 may include one or more adhesive regions that do not necessarily extend across the entire two dimensional surface of the adhesive side. For example, an adhesive region may include a non-adhesive gap corresponding to the battery 320. A surface of the battery 320 is coupled to a portion within the two dimensional area of the first adhesive side 310, as illustrated. The coupling may be achieved by either adhesion or a basic physical positioning. The second adhesive member is positioned over the battery and opposite the first adhesive member with the adhesive side 330 of the second adhesive member facing toward the battery 320 and the non-adhesive side 335 of the second adhesive member facing away from the battery. The first and second adhesive members are preferably aligned to allow sufficient surface area surrounding the battery. The opposite non-adhesive sides 335, 315 of the adhesive devices are then compressed so as to adhesively couple the adhesive sides 310, 330 together thereby encasing, enclosing, and/or sealing the battery 320 within the adhesive devices. The compression is generated by applying oppositely oriented forces upon the opposing portions of the non-adhesive sides 325, 315. Various degrees of sealing may be generated depending on the particular adhesive properties, including but not limited to physical sealing, water-tight sealing, and/or air-tight sealing. The adhesive agent and characteristics of the adhesive side may be adjusted depending on the toxicity and usage model of the particular electrical device to be FIGS. 8-10 illustrate a method of replacing an electrically isolated and/or electrically expended electrical storage device back in an opened storage package in accordance with further embodiments of the present invention, designated at 800, 900, and 1000 respectively. FIG. 8 illustrates an electrical storage device removed from a ripped open retort type storage compartment/pouch similar to one of the pouches illustrated in FIG. 1A. FIG. 9 illustrates inserting an electrically isolated electrical storage device back into the ripped open retort type package. FIG. 10 illustrates the electrically isolated electrical storage device within the ripped open pouch for purposes of storage and/or containment until further disposal is available.

Various other embodiments have been contemplated, including combinations in whole or in part of the embodiments described above.

What is claimed is:

1. An electrical device storage and isolation system comprising:

an electrical storage device configured to store electrical current;

a storage compartment including a substantially enclosed internal region within a housing, wherein the electrical storage device is disposed within the internal region, and wherein the housing includes an exterior surface and a releasable opening to the internal region;

at least one adhesive member including an adhesive surface and a non-adhesive surface oriented substantially opposite the adhesive surface, wherein the at least one adhesive member is releasably coupled to the exterior surface of the storage compartment via the adhesive surface such that the non-adhesive surface is externally exposed, and wherein the at least one adhesive member is disposed entirely within a two dimensional area of the exterior surface, and wherein the releasable opening to the internal region is positionally independent of the at least one adhesive member; and wherein the adhesive surface of the adhesive member is flexible and two dimensionally sized such that the adhesive surface is capable of three dimensionally enclosing and sealing the electrical storage device against a supportive surface, wherein the supportive surface includes at least one of a second adhesive member and the exterior surface of the storage compartment.

2. The system of claim 1, wherein the adhesive member includes a chemical adhesion agent.

3. The system of claim 1, wherein the capable sealing between the adhesive surface and the supportive surface includes a three dimensional water tight seal and thereby forms an internal region having a volume larger than the electrical storage device.

4. The system of claim 1, wherein the adhesive surface and the supportive surface are electrically non-conductive.

5. The system of claim 1, wherein the electrical storage device is a battery further including a positive terminal region and a negative terminal region.

6. The system of claim 1, wherein the at least one adhesive member includes two adhesive members each including an adhesive surface and a non-adhesive surface, and wherein the supportive surface is the adhesive surface of the second adhesive member.

7. The system of claim 6, wherein the internal region of the storage compartment is sized to substantially enclose the two adhesive members and the electrical storage device in a used configuration.

* * * * *